(12) United States Patent
Lee et al.

(10) Patent No.: US 11,709,272 B2
(45) Date of Patent: Jul. 25, 2023

(54) LIDAR APPARATUS FOR VEHICLE INCLUDING A CASE, LASER DIODE, AND OPTICAL SENSOR

(71) Applicant: LG Electronics Inc., Seoul (KR)

(72) Inventors: Yonghyun Lee, Seoul (KR); Jejong Lee, Seoul (KR); Sunghoon Cha, Seoul (KR); Gyujin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 331 days.

(21) Appl. No.: 16/490,216

(22) PCT Filed: Jan. 4, 2019

(86) PCT No.: PCT/KR2019/000144
§ 371 (c)(1),
(2) Date: Aug. 30, 2019

(87) PCT Pub. No.: WO2020/141645
PCT Pub. Date: Jul. 9, 2020

(65) Prior Publication Data
US 2021/0333406 A1    Oct. 28, 2021

(51) Int. Cl.
*G01S 17/931* (2020.01)
*G01S 7/481* (2006.01)
*G02B 26/08* (2006.01)

(52) U.S. Cl.
CPC ........... *G01S 17/931* (2020.01); *G01S 7/4811* (2013.01); *G01S 7/4817* (2013.01); *G02B 26/0833* (2013.01)

(58) Field of Classification Search
CPC .... G01S 17/931; G01S 7/4811; G01S 7/4817; G02B 26/0833
See application file for complete search history.

(56) References Cited

U.S. PATENT DOCUMENTS 11,333,743 B2 *   5/2022   Hori .................. F21S 45/47
11,333,745 B2 *   5/2022   Ahn .................. F21S 41/16
(Continued)

FOREIGN PATENT DOCUMENTS

JP       2015-040824         3/2015
JP         6090433 B2 *      3/2017
KR      20170071181 A *      6/2017
(Continued)

OTHER PUBLICATIONS

International Search Report in International Appln. No. PCT/KR2019/000144, dated Oct. 4, 2019, 5 pages (with English translation).

*Primary Examiner* — Tracie Y Green
(74) *Attorney, Agent, or Firm* — Fish & Richardson P.C.

(57) ABSTRACT

Disclosed is a LIDAR apparatus for a vehicle including a light-emitting unit configured to generate and emit laser light, a light-receiving unit configured to receive reflected light based on the laser light, at least one electronic component electrically connected to the light-emitting unit and the light-receiving unit, and a case configured to accommodate the light-emitting unit, the light-receiving unit, and the electronic component therein, wherein the case is formed of a metal material, and is in contact with at least one element included in at least one of the light-emitting unit, the light-receiving unit, or the electronic component.

15 Claims, 11 Drawing Sheets

(56) References Cited

U.S. PATENT DOCUMENTS

2011/0216304 A1* 9/2011 Hall .................. G01S 17/89
356/4.01
2022/0091270 A1* 3/2022 Hart .................. G01S 17/931

FOREIGN PATENT DOCUMENTS

KR     20180029561    *   3/2018
KR     20180077293 A   *   6/2018

* cited by examiner

LIDAR APPARATUS FOR VEHICLE INCLUDING A CASE, LASER DIODE, AND OPTICAL SENSOR

CROSS-REFERENCE TO RELATED APPLICATION

This application is a National Phase application under 35 U.S.C. § 371 of International Application No. PCT/KR2019/000144, filed on Jan. 4, 2019, the entire disclosure of which is incorporated herein by reference.

TECHNICAL FIELD

The present invention relates to a LIDAR apparatus for a vehicle.

BACKGROUND ART

A vehicle is an apparatus that carries a passenger in a direction intended by the passenger. A car is the main example of such a vehicle.

In order to increase the convenience of vehicle users, a vehicle is equipped with various sensors and electronic devices. In particular, an Advanced Driver Assistance System (ADAS) is under active study with the goal of increasing the driving convenience of users. In addition, efforts are being actively made to develop autonomous vehicles. In order to realize an ADAS or an autonomous driving function in a vehicle, various sensors need to be installed in the vehicle in order to acquire information on objects present around the vehicle.

Among various sensors for detecting objects outside the vehicle, research and development on a Light Detection and Ranging (LIDAR) apparatus is being actively conducted. A vehicle LIDAR apparatus, which is one of various components provided in a vehicle, needs to be made more compact in consideration of limited installation space and interference with other components. Further, a vehicle LIDAR apparatus is vulnerable to heat because heat-sensitive components are used therefor. Furthermore, a vehicle LIDAR apparatus is vulnerable to moisture because electronic components are used therefor.

DISCLOSURE

Technical Problem

Therefore, the present invention has been made in view of the above problems, and it is an object of the present invention to provide a LIDAR apparatus for a vehicle having a heat-dissipating and waterproof structure.

However, the objects to be accomplished by the invention are not limited to the above-mentioned objects, and other objects not mentioned herein will be clearly understood by those skilled in the art from the following description.

Technical Solution

In accordance with the present invention, the above and other objects can be accomplished by the provision of a LIDAR apparatus for a vehicle including a light-emitting unit configured to generate and emit laser light, a light-receiving unit configured to receive reflected light based on the laser light, at least one electronic component electrically connected to the light-emitting unit and the light-receiving unit, and a case formed of a metal material and configured to accommodate the light-emitting unit, the light-receiving unit, and the electronic component therein, wherein the case is in contact with at least one element included in at least one of the light-emitting unit, the light-receiving unit, or the electronic component.

Details of other embodiments are included in the detailed description and the accompanying drawings.

Advantageous Effects

According to the present invention, there are one or more effects as follows.

First, since a case formed of a metal material is in contact with a light-emitting unit, a light-receiving unit, and an electronic component, it exhibits a heat dissipation effect.

Second, since the case has a sealed structure, it exhibits a waterproofing effect.

Third, since a one-dimensional (1D) micro-electro-mechanical-system (MEMS) mirror is used, an object may be more reliably detected and the durability of the apparatus may be improved compared to the case in which a two-dimensional (2D) MEMS mirror is used.

However, the effects achievable through the invention are not limited to the above-mentioned effects, and other effects not mentioned herein will be clearly understood by those skilled in the art from the following description.

BEST MODE

Reference will now be made in detail to the preferred embodiments of the present invention, examples of which are illustrated in the accompanying drawings. Wherever possible, the same reference numbers will be used throughout the drawings to refer to the same or like parts. As used herein, the suffixes "module" and "unit" are added or interchangeably used to facilitate preparation of this specification and are not intended to suggest unique meanings or functions. In describing embodiments disclosed in this specification, a detailed description of relevant well-known technologies may not be given in order not to obscure the subject matter of the present invention. In addition, the accompanying drawings are merely intended to facilitate understanding of the embodiments disclosed in this specification and not to restrict the technical spirit of the present invention. In addition, the accompanying drawings should be understood as covering all equivalents or substitutions within the scope of the present invention.

Terms including ordinal numbers such as first, second, etc. may be used to explain various elements. However, it will be appreciated that the elements are not limited to such terms. These terms are merely used to distinguish one element from another.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

The expression of singularity includes a plural meaning unless the singularity expression is explicitly different in context.

It will be further understood that terms such as "include" or "have", when used in this specification, specify the presence of stated features, integers, steps, operations, elements, components, or combinations thereof, but do not preclude the presence or addition of one or more other features, integers, steps, operations, elements, components, or combinations thereof.

The vehicle described in this specification may include an automobile and a motorcycle. Hereinafter, description will be given mainly focusing on an automobile.

The vehicle described in this specification may be any of an internal combustion vehicle equipped with an engine as a power source, a hybrid vehicle equipped with an engine and an electric motor as power sources, an electric vehicle equipped with an electric motor as a power source, and the like.

In the description below, the left side of the vehicle means the left side with respect to the travel direction of the vehicle and the right side of the vehicle means the right side with respect to the travel direction of the vehicle.

Figure 1:
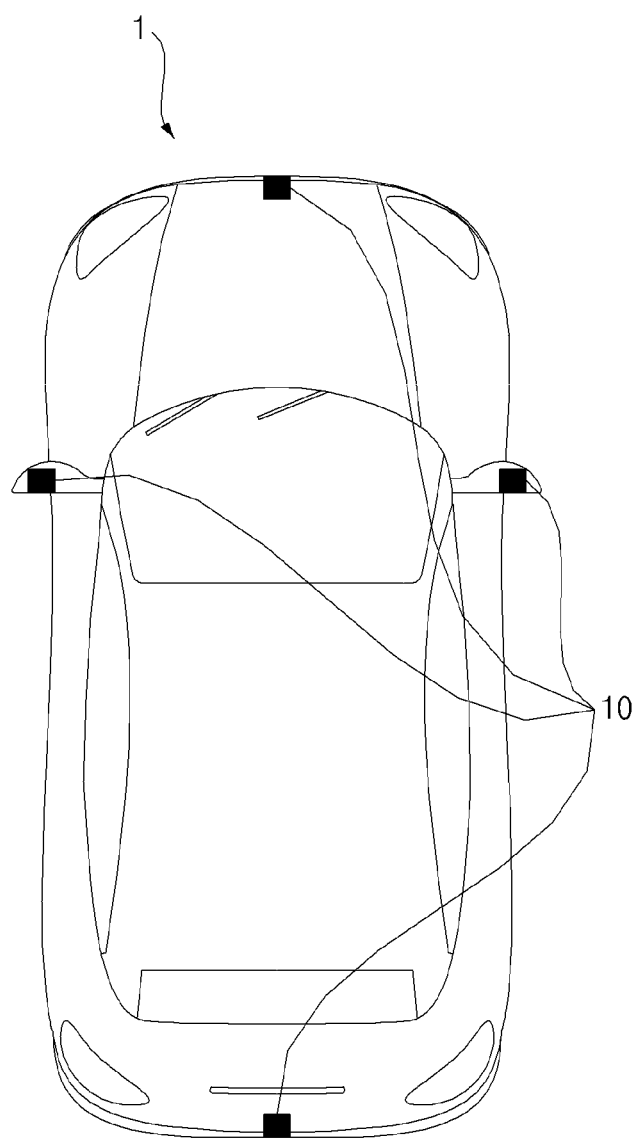
FIG. 1 is a view illustrating a LIDAR apparatus for a vehicle that is installed in a vehicle.

FIG. 1 is a view illustrating a LIDAR apparatus for a vehicle that is installed in a vehicle.

A vehicle 1 may include at least one vehicle LIDAR apparatus 10. For example, the vehicle 1 may include a first LIDAR apparatus configured to output light forwards, a second LIDAR apparatus configured to output light backwards, a third LIDAR apparatus configured to output light leftwards, and a fourth LIDAR apparatus configured to output light rightwards.

The vehicle LIDAR apparatus 10 may detect an object located outside the vehicle 1. The vehicle LIDAR apparatus 10 may detect an object based on a Time of Flight (TOF) scheme or a phase-shift scheme using output light, and may detect the location of the detected object, the distance to the detected object, and the speed relative to the detected object.

Figure 2:
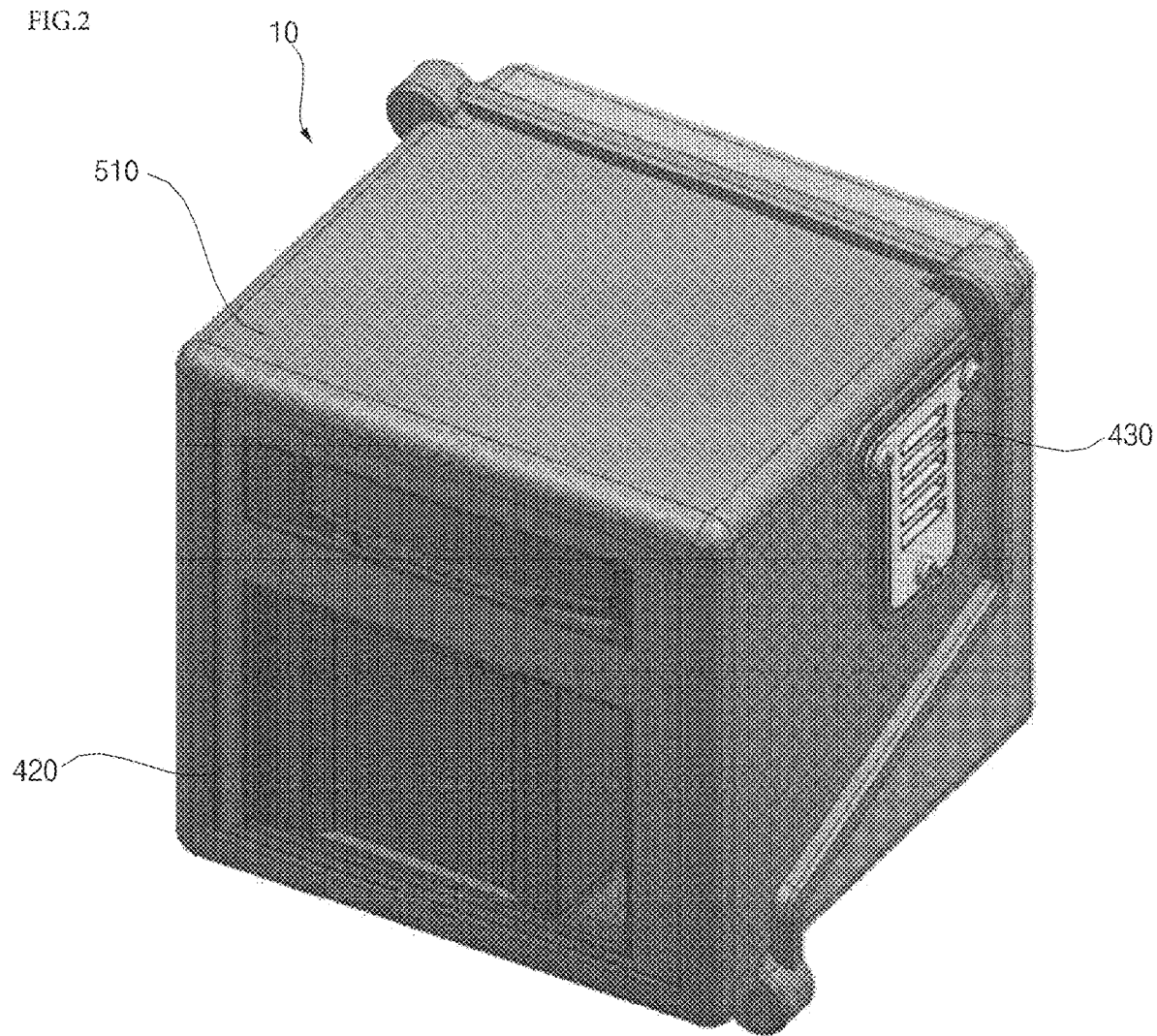
FIG. 2 is a view illustrating the LIDAR apparatus for a vehicle according to the embodiment of the present invention when viewed in a specific direction.
Figure 2:
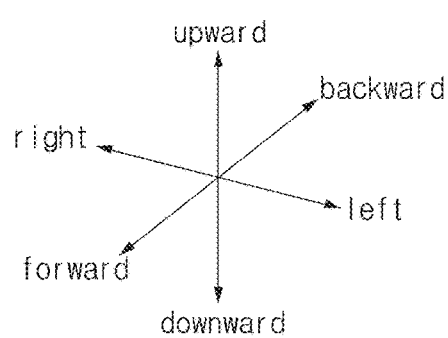

FIG. 2 is a view illustrating the LIDAR apparatus for a vehicle according to the embodiment of the present invention when viewed in a specific direction.

Figure 3:
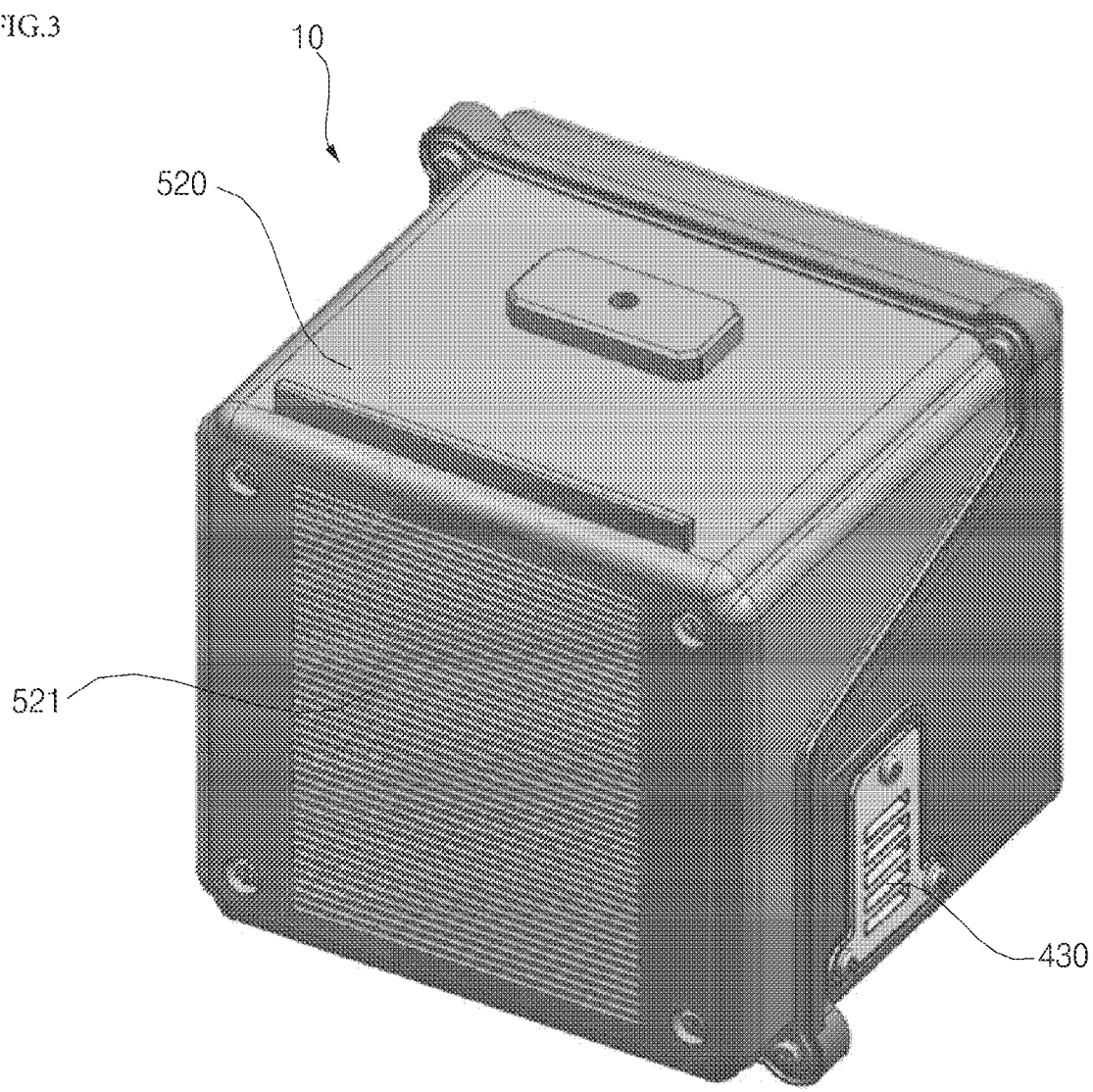
FIG. 3 is a view illustrating the LIDAR apparatus for a vehicle according to the embodiment of the present invention when viewed in a specific direction.
Figure 3:
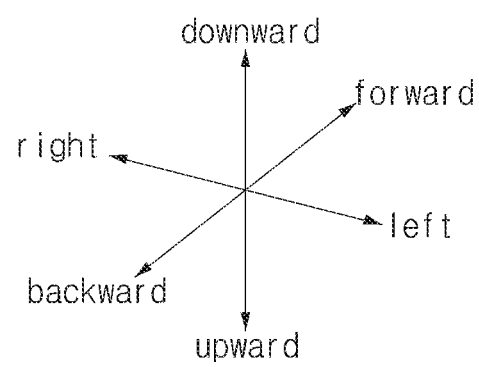

FIG. 3 is a view illustrating the LIDAR apparatus for a vehicle according to the embodiment of the present invention when viewed in a specific direction.

Figure 4:
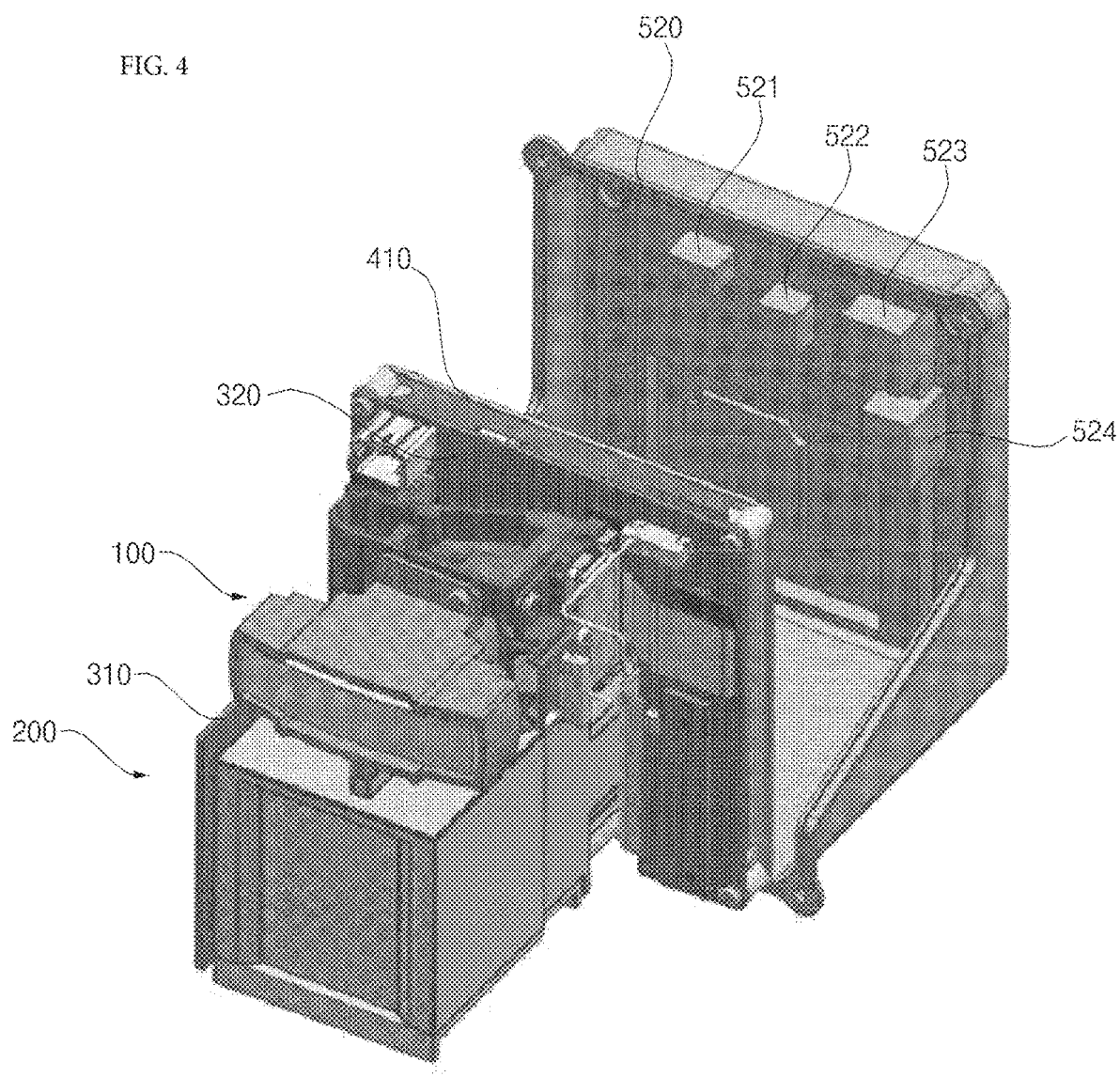
FIG. 4 is a view illustrating the LIDAR apparatus for a vehicle according to the embodiment of the present invention, from which a portion of a case is removed, when viewed in a specific direction.
Figure 4:
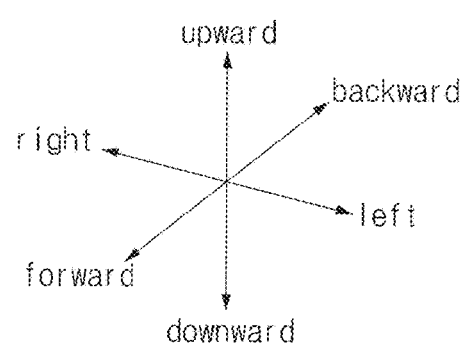

FIG. 4 is a view illustrating the LIDAR apparatus for a vehicle according to the embodiment of the present invention, from which a portion of a case is removed, when viewed in a specific direction.

Figure 5:
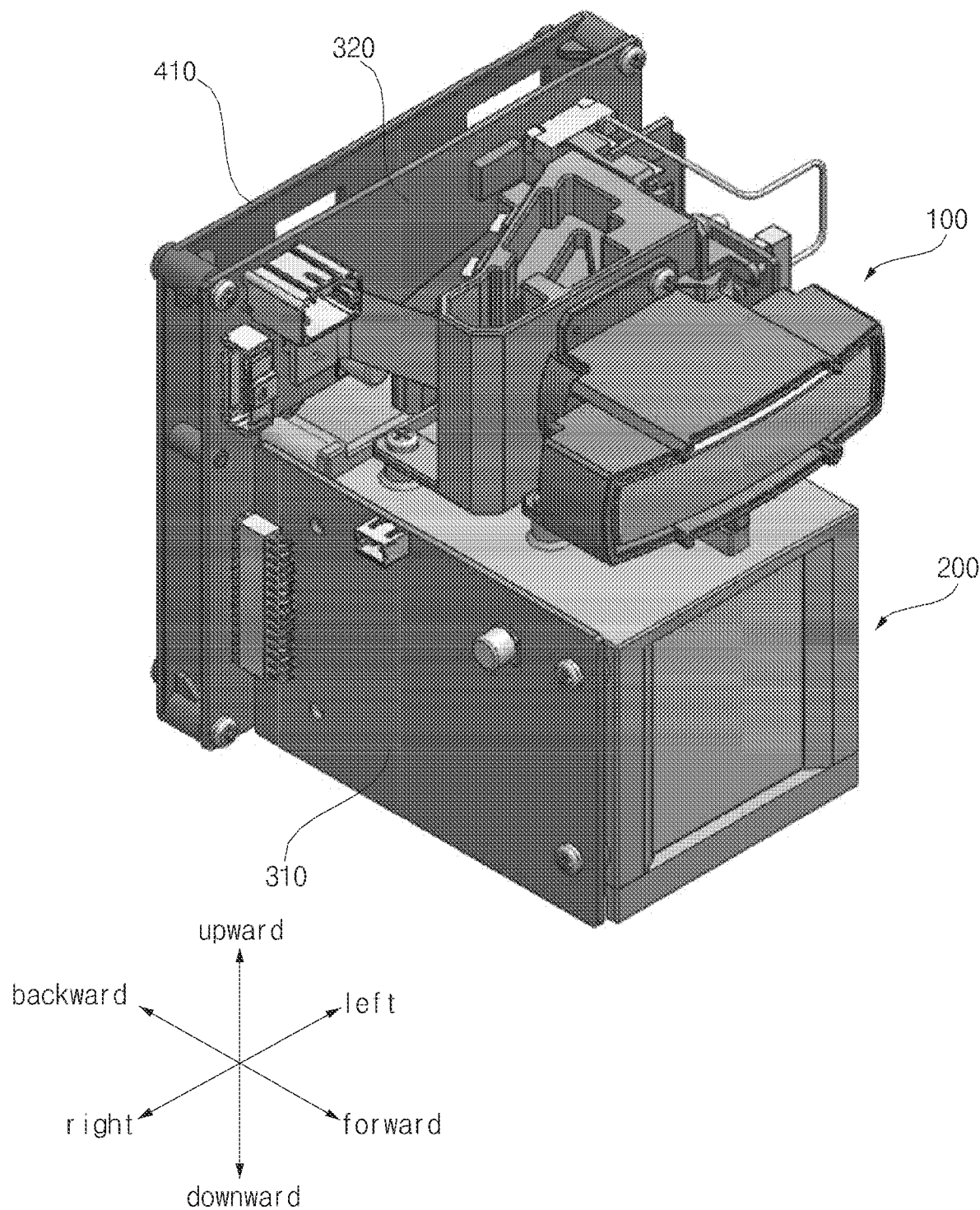
FIG. 5 is a view illustrating the LIDAR apparatus for a vehicle according to the embodiment of the present invention, from which a portion of the case is removed, when viewed in a specific direction.

FIG. 5 is a view illustrating the LIDAR apparatus for a vehicle according to the embodiment of the present invention, from which a portion of the case is removed, when viewed in a specific direction.

Figure 6:
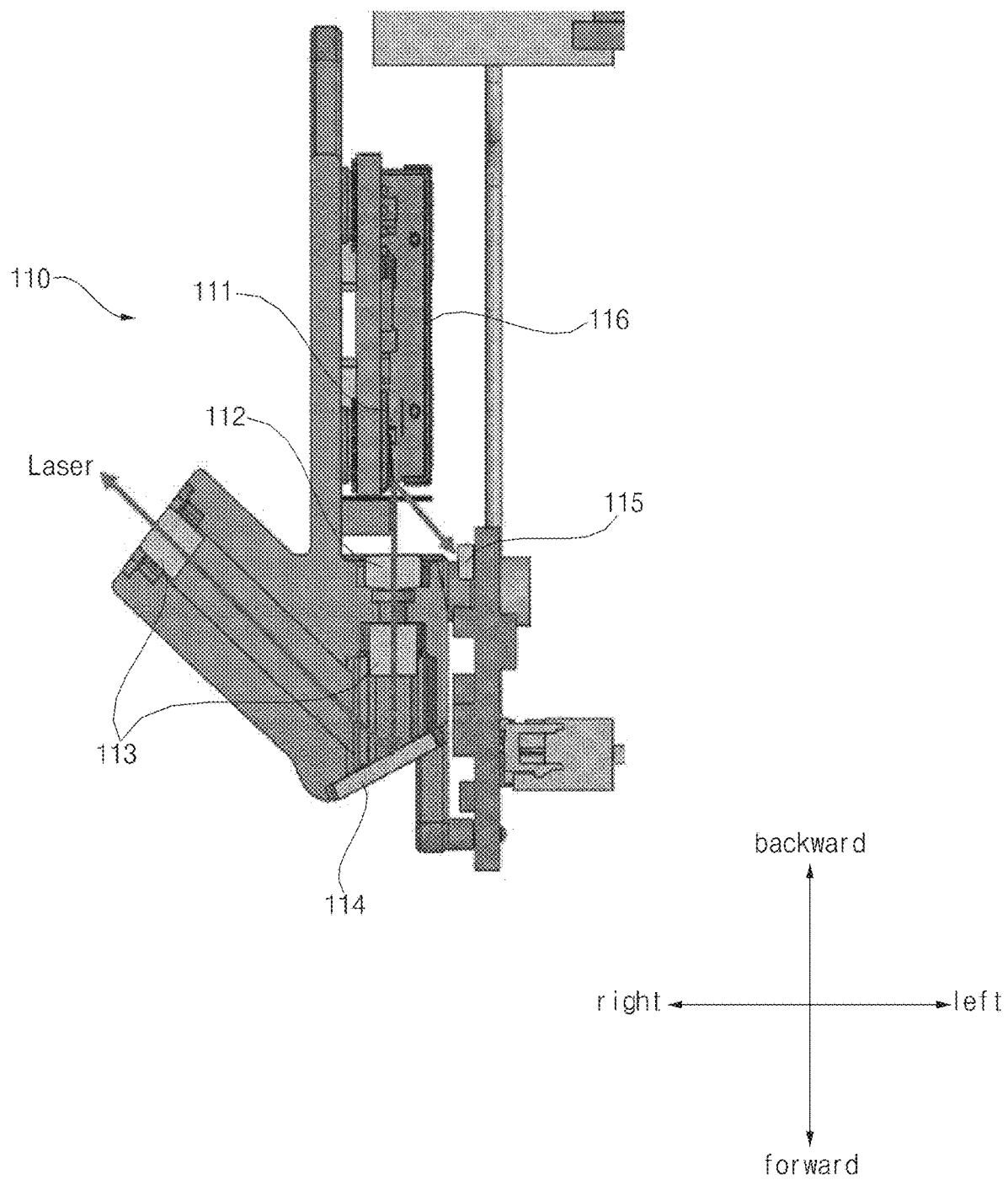
FIGS. 6 to 8 are views for explaining a light-emitting unit according to the embodiment of the present invention.
Figure 7:
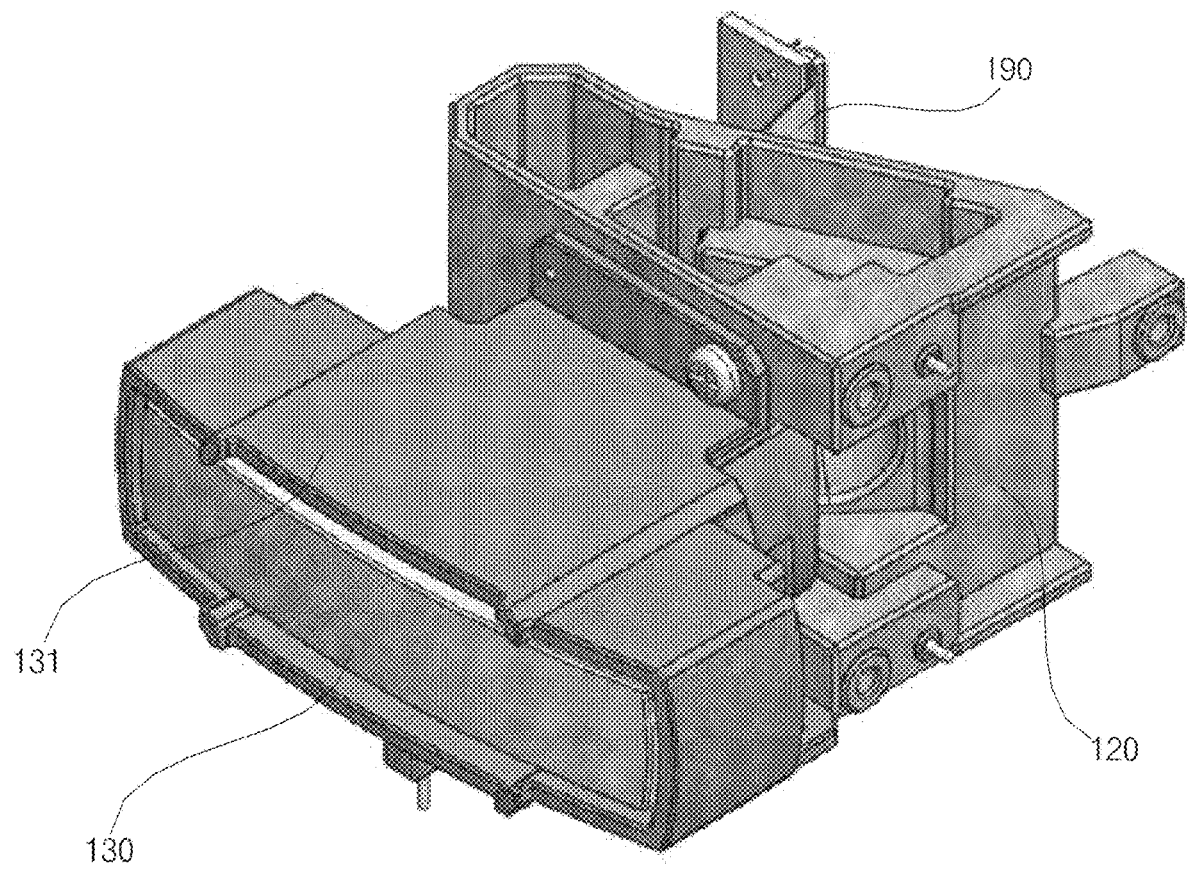
Figure 7:
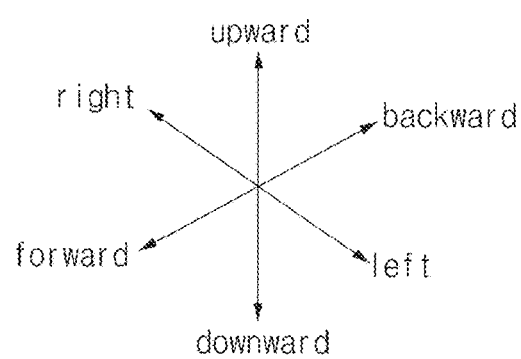
Figure 8:
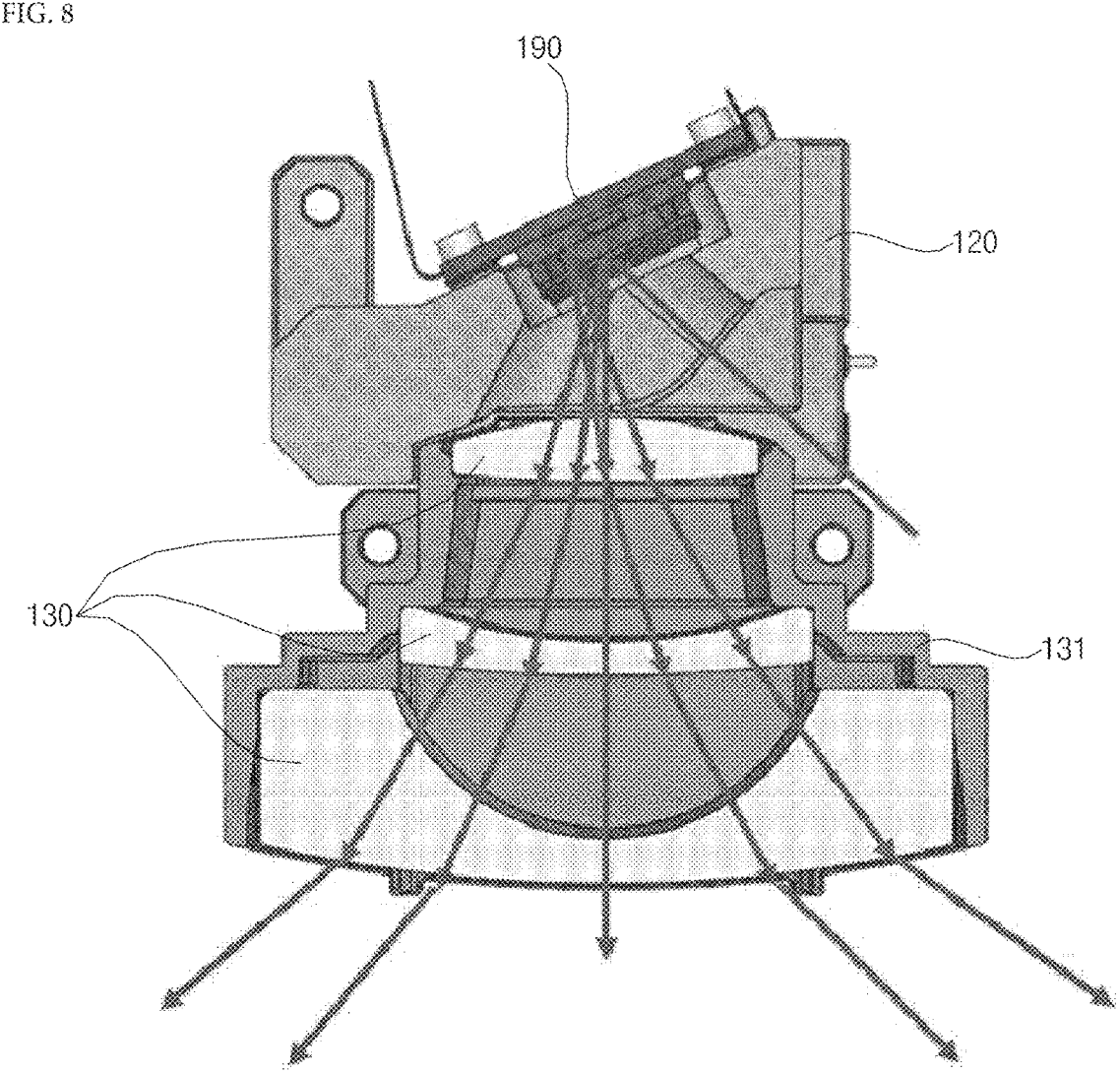
Figure 8:
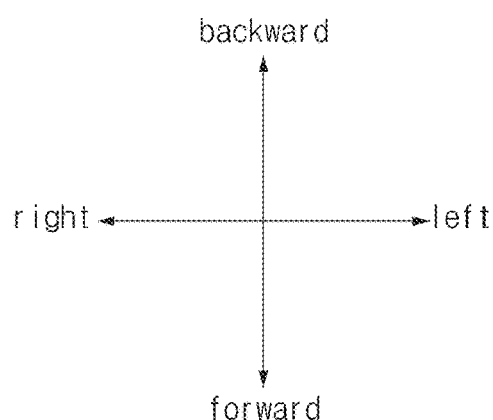

FIGS. 6 to 8 are views for explaining a light-emitting unit according to the embodiment of the present invention.

Figure 9:
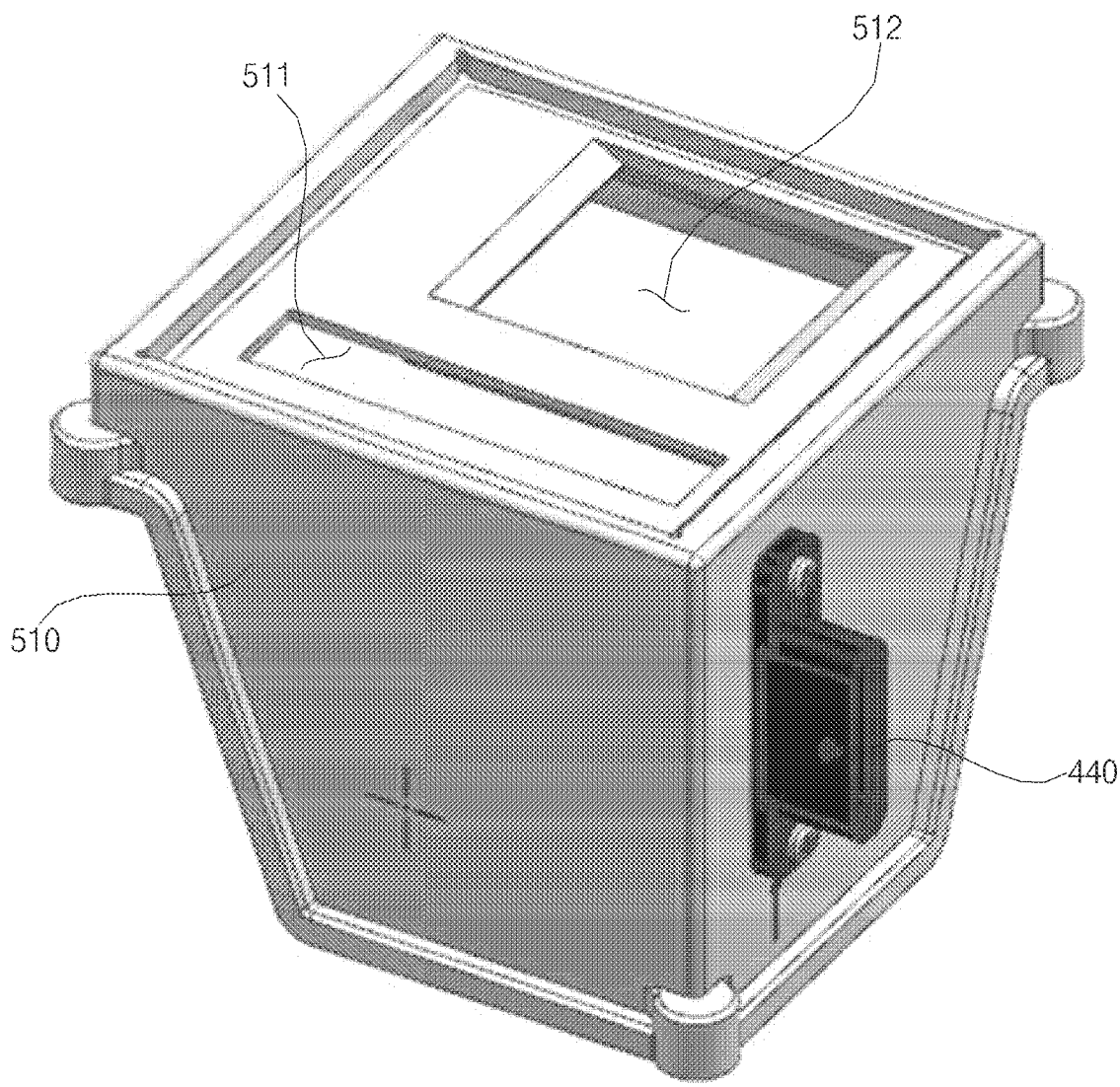
FIGS. 9 and 10 are views for explaining the case according to the embodiment of the present invention.
Figure 9:
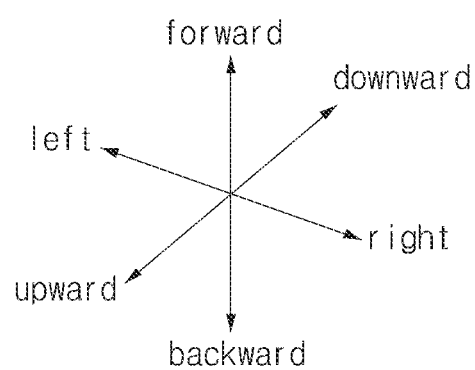
Figure 10:
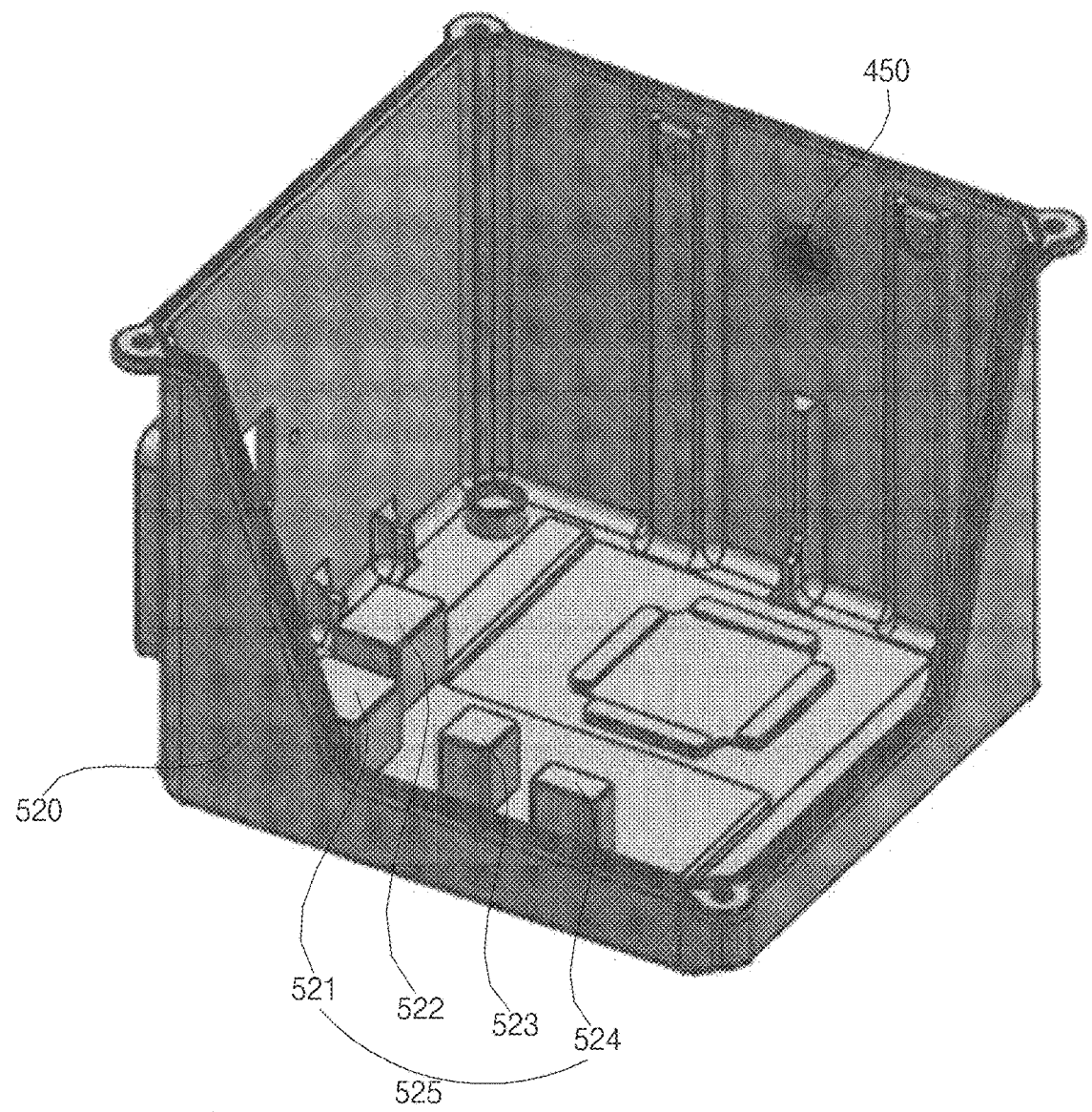
Figure 10:
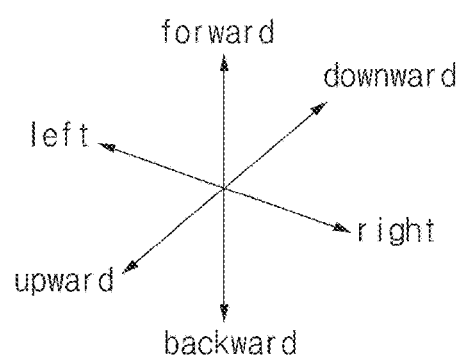

FIGS. 9 and 10 are views for explaining the case according to the embodiment of the present invention.

Figure 11:
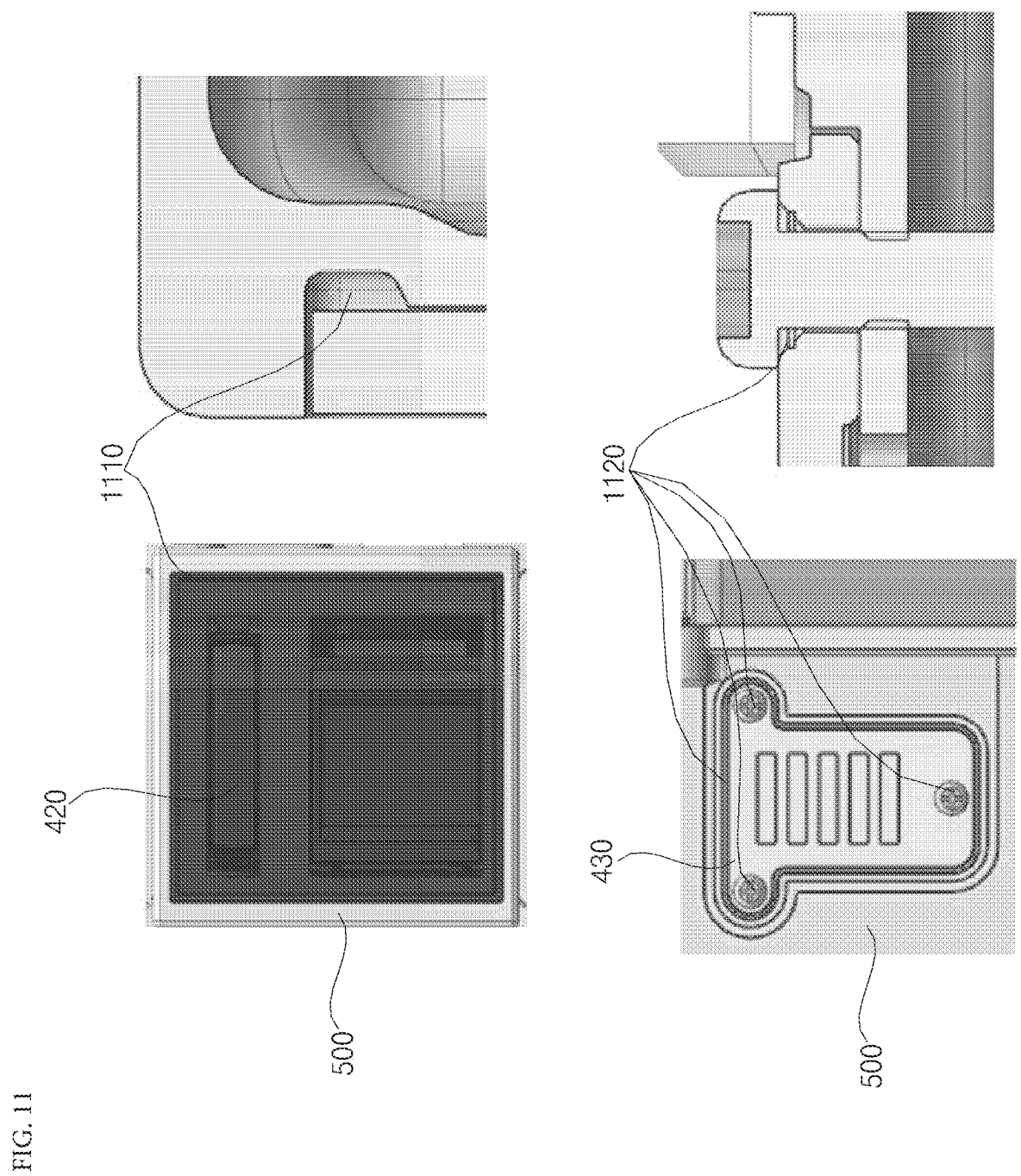
FIG. 11 is a view for explaining the sealed structure of the case according to the embodiment of the present invention.

FIG. 11 is a view for explaining the sealed structure of the case according to the embodiment of the present invention.

Referring to the drawings, the vehicle LIDAR apparatus 10 may include a light-emitting unit 100, a light-receiving unit 200, at least one electronic component 300, and a case 500. In some embodiments, the vehicle LIDAR apparatus 10 may further include a bracket 410, a window 420, a heat sink 430, a connector 440, and a membrane 450 in an individual manner or a combined manner.

The light-emitting unit 100 may generate and output laser light. The light-emitting unit 100 may generate and output laser light in the infrared wavelength band, which is harmless to the human body. The light-emitting unit 100 may generate and output light within an extent to which the light is harmless to the human body.

The light-emitting unit 100 may include a light-outputting device 110, a micro-electro-mechanical system (MEMS) 190, and at least one expansion lens 130. The light-outputting device 110 may have an approximate rod shape. The light-outputting device 110 may include a laser diode 111, at least one collimator lens 112, at least one cylindrical lens 113, a mirror 114, an optical sensor 115, and a shield can 116. The light-outputting device 110 may provide line light to the MEMS mirror 190.

The laser diode 111 may generate laser light. The laser diode 111 may generate laser light in the infrared wavelength band. The light generated from the laser diode 111 may be provided to the MEMS 190 via the collimator lens 112 and the cylindrical lens 113. At least one mirror 114 may be provided in the optical path formed from the laser diode 111 to the MEMS 190 in order to change the optical path.

The collimator lens 112 may convert the light generated from the laser diode 111 into parallel light. The cylindrical lens 113 may convert the parallel light, having passed through the collimator lens 112, into line light.

The mirror 114 may reflect the light generated from the laser diode 111 toward the MEMS 190. The mirror 114 may be disposed in the optical path formed from the laser diode 111 to the MEMS 190. As illustrated in FIG. 6, the mirror 114 may be disposed between the first cylindrical lens and the second cylindrical lens. The mirror 114 may reflect the light incident thereon toward the MEMS 190. Due to the mirror 114, it is possible to more flexibly form the optical path and thus to reduce the overall volume of the LIDAR apparatus 10.

The optical sensor 115 may be disposed near the collimator lens 112. The optical sensor 115 may be disposed at an oblique angle relative to the straight optical path. The optical sensor 115 may sense spreading light, rather than light that travels straight. The optical sensor 115 may sense the intensity of light generated from the laser diode. The optical sensor 115 may provide sensing data to a processor. The processor may determine whether the laser diode 111 is operating normally based on the sensing data provided by the optical sensor 115.

The shield can 116 may cover the laser diode 111. The shield can 116 may protect the laser diode 111. The shield can 116 may be formed of a metal material. The shield can 116 may be in contact with the heat sink 430.

The MEMS 190 may steer the laser light to the outside of the vehicle 1. The MEMS 190 may reflect the light output from the light-outputting device 110 to the outside of the vehicle 10. The MEMS 190 may reflect the light in a specific direction according to a preset Field of View (FOV) while scanning the light. The MEMS 190 may scan line light in the leftward-and-rightward direction (or in the horizontal direction). For example, when the vehicle LIDAR apparatus 10 is mounted at the front of the vehicle 10, the MEMS 190 may reflect light in the forward direction of the vehicle while scanning the light. For example, when the vehicle LIDAR apparatus 10 is mounted at the rear of the vehicle 10, the MEMS 190 may reflect light in the rearward direction of the vehicle while scanning the light. For example, when the vehicle LIDAR apparatus 10 is mounted on the left side of the vehicle 10, the MEMS 190 may reflect light in the leftward direction of the vehicle while scanning the light. For example, when the vehicle LIDAR apparatus 10 is mounted on the right side of the vehicle 10, the MEMS 190 may reflect light in the rightward direction of the vehicle while scanning the light.

The expansion lens 130 may expand the range within which line light is emitted. For example, the expansion lens 130 may expand the emission range of line light in the leftward-and-rightward direction (or in the horizontal direction). Due to the expansion lens 130, it is possible for the light-emitting unit 100 to emit line light at an angle greater than the angle at which the MEMS 190 scans light. Thus, it is not necessary to use a high-quality MEMS, leading to a reduction in manufacturing costs and a reduction in the overall volume of the LIDAR apparatus 10. The light-emitting unit 100 may further include an expansion cylinder 131. As illustrated in FIG. 8, the expansion cylinder 131 may receive the expansion lens 130 therein and may support the same.

The light-emitting unit 100 may further include a housing 120. The housing 120 may receive the light-outputting device 110 therein and may support the same. The housing 120 may be coupled to the expansion cylinder 130 and the MEMS 190.

The light-receiving unit 200 may receive the reflected light based on the laser light emitted from the light-emitting unit 100. The light-receiving unit 200 may include a light-receiving lens, a lens barrel, and a sensor. The light-receiving lens may guide the reflected light to the sensor. The reflected light may be laser light output from the light-emitting unit 100 and then reflected by an object present outside the vehicle 1. A plurality of light-receiving lenses may be provided. The light-receiving lens may be supported by the lens barrel. The lens barrel may support the light-receiving lens. The lens barrel may have an approximately hexahedral shape. The sensor may convert the reflected light into an electrical signal. The sensor may include at least one photodiode. The sensor may be formed in a one-dimensional (1D) array in which a plurality of photodiodes is arranged in a straight line. Since the output light takes the form of line light, the reflected light also takes the form of line light, and thus an object may be detected using the sensor formed in a 1D array.

The electronic component 300 may be electrically connected to the light-emitting unit 100 and the light-receiving unit 200. The electronic component 300 may include at least one printed circuit board 310 and 320, and may further include at least one processor, a memory, an electronic element, a power supply element, and an interface unit, which are mounted on the printed circuit board 310 and 320.

The electronic component 300 may include a first printed circuit board (PCB) 310. At least one power supply element and an interface unit may be mounted on the first printed circuit board 310. The power supply element may receive power from the battery of the vehicle 1 and may supply the power to each unit of the vehicle LIDAR apparatus 10. The first printed circuit board 310 may be electrically connected to the light-emitting unit 100, the light-receiving unit 200, and the second printed circuit board 320 via the interface unit. The power supply element mounted on the first printed circuit board 310 may be electrically connected to the light-emitting unit 100, the light-receiving unit 200, and the second printed circuit board 320 via the interface unit. The first printed circuit board 310 may be vertically disposed behind the MEMS mirror. The first printed circuit board 310 may be vertically disposed close to the rear surface of the case 500.

The electronic component 300 may include a second printed circuit board 320. At least one processor, a memory, an electronic element, and an interface unit may be mounted on the second printed circuit board 320. The processor may include at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, or microprocessors. The memory may include at least one of ROMs, RAMs, EPROMs, flash drives, or hard drives. The second printed circuit board 320 may be electrically connected to the light-emitting unit 100, the light-receiving unit 200, and the first printed circuit board 310. The processor may control the light-emitting unit 100 and the light-receiving unit 200. The processor may perform computer processing in response to the electrical signal generated from the sensor. The second printed circuit board 320 may be disposed perpendicular to the first printed circuit board. The second printed circuit board 320 may be vertically disposed close to the side surface of the case 500. Due to the arrangement characteristics of the first printed circuit board 310 and the second printed circuit board 320, a more compact vehicle LIDAR apparatus 10 may be manufactured.

In some embodiments, the electronic component 300 may further include a laser diode printed circuit board, on which the laser diode 111 is mounted. In some embodiments, the electronic component 300 may further include an optical sensor printed circuit board, on which the optical sensor is mounted. In some embodiments, the electronic component 300 may further include a sensor printed circuit board, on which the reflected-light-receiving sensor is mounted.

The LIDAR apparatus 10 may further include at least one FPCB. The FPCB may function as a medium for connecting the light-emitting unit 100, the light-receiving unit 200, and the electronic component 300 to one another.

The case 500 may form the external appearance of the vehicle LIDAR apparatus 10. In some embodiments, the case 500 may be divided into a plurality of parts, and when the parts are combined together, the case 500 may form the external appearance of the vehicle LIDAR apparatus. The case 500 may accommodate the light-emitting unit 100, the light-receiving unit 200, and the electronic component 300 therein. The case 500 may have a space formed therein. The light-emitting unit 100, the light-receiving unit 200, and the electronic component 300 may be disposed inside the case 500.

The case 500 may be formed of a material having high thermal conductivity. For example, the case 500 may be formed of a metal material. The case 500 may be in contact with at least one element included in at least one of the light-emitting unit 100, the light-receiving unit 200, or the electronic component 300.

As illustrated in FIG. 10, the case 500 may include a protruding portion 525 protruding inwards so as to be in contact with at least one electronic component 300. A processor, a memory, and an electronic element may be mounted on the second printed circuit board 320. The processor, the memory, and the electronic element may be mounted so as to be oriented toward the case 500. The protruding portion 525 may be in direct contact with the processor, the memory, and the electronic element. The protruding portion 525 may be in indirect contact with the processor, the memory, and the electronic element, with a thermal pad interposed therebetween. Heat generated from the processor, the memory, and the electronic element may be dissipated outside via the case 500. The protruding portion 525 may have a columnar shape. The upper surface of the protruding portion 525, which is in contact with the electronic component 300, may have a shape corresponding to the shape of the electronic component 300. For example, when the surface of the processor, which faces the inner surface of the case 500, has a rectangular shape, the upper surface of the protruding portion 525 may have the same shape as the rectangular shape. The area of the upper surface of the protruding portion 525 may be larger than the area of the electronic component 300 facing the inner surface of the case 500. The protruding portion 525 may be provided in a number corresponding to the number of heat-generating parts of the electronic component 300. As illustrated in FIG. 10, when four heat-generating parts are included in the electronic component 300, four protruding portions 521, 522, 523 and 524 may be provided.

The case 500 may have a shape of a heat dissipation fin for increasing a contact area with air on at least a portion thereof. For example, the heat dissipation fin may be formed on the rear surface 521 of the case 500, which is oriented in the rearward direction of the vehicle LIDAR apparatus 10.

When the case 500 is divided into a plurality of parts, the parts may be coupled to each other in a sealing manner. For example, the case 500 may include a first case 510 and a second case 520. For example, the first case 510 may form the front surface, the upper surface, a portion of the left surface, and a portion of the right surface of the external appearance of the vehicle LIDAR apparatus 10. For example, the second case 520 may form the rear surface, the lower surface, a portion of the left surface, and a portion of the right surface of the external appearance of the vehicle LIDAR apparatus 10. The second case 520 may be formed in a shape that fits the shape of the first case 510. The second case 520 may be coupled to the first case 510 in a sealing manner. For example, the second case 520 may be coupled to the first case 510 using silicon. In this case, the coupling portion of at least one of the first case 510 or the second case 520 may have a space in which silicon is applied. For example, the first case 510 may have a groove formed in the coupling portion thereof that comes into contact with the second case 520. The second case 520 may have a protruding portion that fits in the groove. The first case 510 and the second case 520 may be coupled to each other in a sealing manner such that the protruding portion is inserted into the groove having silicon therein. In some embodiments, the first case 510 may have a protruding portion, and the second case 520 may have a groove formed therein.

In some embodiments, the first case 510 may have a plurality of bosses, and the second case 520 may have a plurality of holes formed therein. The first case 510 and the second case 520 may be coupled to each other using bolts, which penetrate the holes and are fastened to the bosses. Grooves, in which silicon is applied, may be formed around the holes. The first case 510 and the second case 520 may be coupled to each other in a sealing manner such that silicon is applied around the bolts after the bolts are fastened. In this case, silicon may be introduced into the grooves formed in the second case 520, thereby securing airtightness. In some embodiments, the first case 510 may have a plurality of holes formed therein, and the second case 520 may have a plurality of bosses.

In some embodiments, the second case 520 may be coupled to the first case 510, with a gasket (or an O-ring) interposed therebetween.

The bracket 410 may be formed of a metal material. The bracket 410 may support the electronic component 300. For example, the second printed circuit board 320 may be mounted to the bracket 410. The bracket 410 may support the second printed circuit board 320 so that the second printed circuit board 320 is not damaged. The bracket 410 may have at least one hole formed therein. The processor, the memory, and the electronic element, which are mounted on the second printed circuit board 320, may be in contact with the protruding portions 525 of the case 500 through the holes formed in the bracket 410.

The bracket 410 may support the light-emitting unit 100 and the light-receiving unit 200. The light-emitting unit 100 may be mounted to the bracket 410. The light-receiving unit 200 may be mounted to the bracket 410. For example, one surface of the bracket 410 may be divided into a first region, a second region, and a third region. The light-emitting unit 100 may be mounted in the first region, the light-receiving unit 200 may be mounted in the second region, and the second printed circuit board 320 may be mounted in the third region.

The window 420 may be formed of a transparent material. The window 420 may cover an opening formed in the case 500. The case 500 may have an opening through which laser light is emitted and reflected light is received. The window 420 may cover the light-emitting unit 100 and the light-receiving unit 200 by covering the opening. The window 420 may allow laser light emitted from the light-emitting unit 100 and reflected light to pass therethrough. The window 420 may include a filter, which allows laser light and reflected light in the infrared wavelength band to pass therethrough and blocks light in other wavelength bands.

The window 420 may be coupled to the case 500 in a sealing manner. For example, the window 420 may be coupled to the case 500 using silicon. In this case, the coupling portion of at least one of the window 420 or the case 500 may have a space 1110 in which silicon is applied. For example, the case 500 may have a groove formed in the coupling portion thereof that comes into contact with the window 420. The window 420 may have a protruding portion that fits in the groove. The window 420 and the case 500 may be coupled to each other in a sealing manner such that the protruding portion is inserted into the groove having silicon therein. In some embodiments, the window 420 may have a groove formed therein, and the case 500 may have a protruding portion.

In some embodiments, the window 420 may be coupled to the case 500, with a gasket (or an O-ring) interposed therebetween.

The heat sink 430 may dissipate heat generated from the laser diode 111 to the outside. The heat sink 430 may be formed of a metal material. The heat sink 430 may be in contact at one end thereof with the shield can 116. The heat sink 430 may be coupled at the opposite end thereof to the case 500 in a sealing manner. The case 500 may have a hole formed therein for coupling to the heat sink 430. The heat sink 430 may be coupled to the case 500 in a sealing manner through the hole formed in the case 500. For example, the heat sink 430 may be coupled to the case 500 using silicon. In this case, the coupling portion of at least one of the heat sink 430 or the case 500 may have a space 1120 in which silicon is applied. For example, the case 500 may have a groove formed in the coupling portion thereof that comes into contact with the heat sink 430. The heat sink 430 may have a protruding portion that fits in the groove. The heat sink 430 and the case 500 may be coupled to each other in a sealing manner such that the protruding portion is inserted into the groove having silicon therein. In some embodiments, the heat sink may have a groove formed therein, and the case 500 may have a protruding portion.

In some embodiments, the case 500 may have a plurality of holes formed therein, and the heat sink 430 may have a plurality of holes formed therein. The heat sink 430 may be coupled to the case 500 by fastening bolts to the holes in the case 500 through the holes in the heat sink 430. Grooves, in which silicon is applied, may be formed around the holes in the case 500 and the holes in the heat sink 430. The heat sink 430 may be coupled to the case 500 in a sealing manner such that silicon is applied around the bolts after the bolts are fastened. In this case, silicon may be introduced into the holes formed in the case 500 and the holes formed in the heat sink 430, thereby securing airtightness.

In some embodiments, the heat sink 430 may be coupled to the case 500, with a gasket (or an O-ring) interposed therebetween. One surface of the heat sink 430 may be exposed outside. The surface that is exposed outside may have the shape of a heat dissipation fin.

The connector 440 may exchange signals with other electronic devices included in the vehicle 1. The connector 440 may have a waterproof structure.

The membrane 450 may be disposed in at least a portion of the case 500. The membrane 450 may discharge moisture from the interior of the LIDAR apparatus 10 to the outside, and may block the introduction of external moisture into the LIDAR apparatus.

The present invention may be implemented as computer-readable code stored on a computer-readable recording medium. The computer-readable recording medium may be any type of recording device in which data is stored in a computer-readable manner. Examples of the computer-readable recording medium include a Hard Disk Drive (HDD), a Solid State Disk (SSD), a Silicon Disk Drive (SDD), Read-Only Memory (ROM), Random-Access Memory (RAM), CD-ROM, magnetic tapes, floppy disks, optical data storage devices, carrier waves (e.g. transmission via the Internet), etc. In addition, the computer may include a processor and a controller. The above embodiments are therefore to be construed in all aspects as illustrative and not restrictive. It is intended that the present invention cover the modifications and variations of this invention provided they come within the scope of the appended claims and their equivalents.

DESCRIPTION OF REFERENCE NUMERALS

1: vehicle
10: LIDAR for vehicle

The invention claimed is:

1. A light detection and ranging (LIDAR) apparatus for a vehicle, the LIDAR apparatus comprising:
   a light-emitting unit configured to generate and emit laser light;
   a light-receiving unit configured to receive reflected light based on light-emitting unit emitting the laser light;
   at least one electronic component electrically connected to the light-emitting unit and the light-receiving unit; and
   a case that accommodates the light-emitting unit, the light-receiving unit, and the at least one electronic component therein,
   wherein the case is made of a metal material and is in contact with at least one element included in at least one of the light-emitting unit, the light-receiving unit, or the at least one electronic component, and
   wherein the light-emitting unit comprises:
      a laser diode configured to generate the laser light,
      a microelectromechanical system (MEMS) configured to steer the laser light toward an outside of the vehicle,
      a mirror configured to reflect the laser light generated from the laser diode toward the MEMS,
      a collimator lens configured to convert the laser light generated from the laser diode into parallel light, and
      an optical sensor disposed near the collimator lens and configured to sense an intensity of the laser light generated from the laser diode.

2. The LIDAR apparatus of claim 1, wherein the light-emitting unit further comprises
   a shield can that covers the laser diode.

3. The LIDAR apparatus of claim 2, wherein the light-emitting unit further comprises:
   a cylindrical lens configured to convert the parallel light into line light; and
   an expansion lens configured to expand an emission range of the line light in a leftward-and-rightward direction.

4. The LIDAR apparatus of claim 1, wherein the at least one electronic component comprises:
   at least one printed circuit board; and
   at least one processor, a memory, an electronic element, a power supply element, and an interface unit, which are mounted on the at least one printed circuit board.

5. The LIDAR apparatus of claim 1, wherein the case comprises a protruding portion that protrudes inwards of the case and that is in contact with the at least one electronic component.

6. The LIDAR apparatus of claim 1, wherein the case has a shape of a heat dissipation fin that defines a contact area with air on at least a portion thereof.

7. The LIDAR apparatus of claim 1, wherein the case comprises:
   a first case; and
   a second case coupled to the first case in a sealing manner.

8. The LIDAR apparatus of claim 1, further comprising a bracket that is made of a metal material, that supports the at least one electronic component, and that is coupled to the case.

9. The LIDAR apparatus of claim 2, further comprising a heat sink that is in contact at one end thereof with the shield can and that is coupled at an opposite end thereof to the case in a sealing manner.

10. The LIDAR apparatus of claim 1, further comprising a window that is made of a transparent material, that covers the light-emitting unit and the light-receiving unit, and that is coupled to the case in a sealing manner.

11. The LIDAR apparatus of claim 1, wherein the collimator lens is configured to receive a first portion of the laser light generated from the laser diode, and
   wherein the optical sensor is disposed outside of a propagation range of the first portion of the laser light and configured to receive a second portion of the laser light generated from the laser diode.

12. The LIDAR apparatus of claim 11, wherein the first portion of the laser light defines a straight optical path to the collimator lens, and wherein the second portion of the laser light incident to the optical sensor is inclined with respect to the straight optical path.

13. The LIDAR apparatus of claim 1, further comprising a processor that is configured to receive sensing data from the optical sensor and that is configured to, based on the sensing data, determine whether the laser diode operates normally.

14. The LIDAR apparatus of claim 1, wherein the light-emitting unit is spaced apart from the light-receiving unit in a first direction, and wherein the collimator lens and the optical sensor are spaced apart from each other in a second direction that is orthogonal to the first direction.

15. The LIDAR apparatus of claim 14, wherein the mirror is spaced apart from the collimator lens in a third direction that is orthogonal to the first direction and the second direction.

\* \* \* \* \*